Aug. 12, 1930.  C. E. JOHNSON  1,772,719
VARIABLE SPEED SQUIRREL CAGE MOTOR
Filed Sept. 30, 1926   3 Sheets-Sheet 1
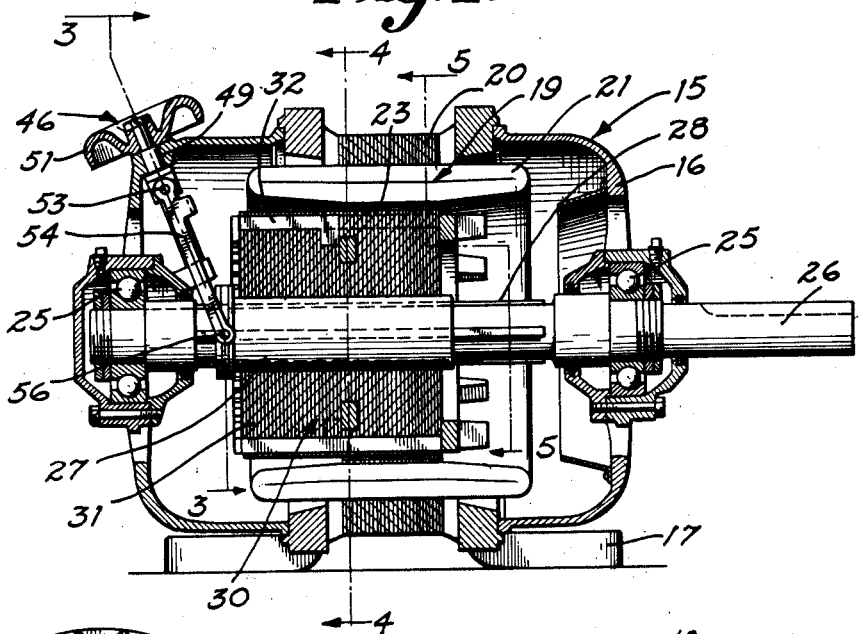
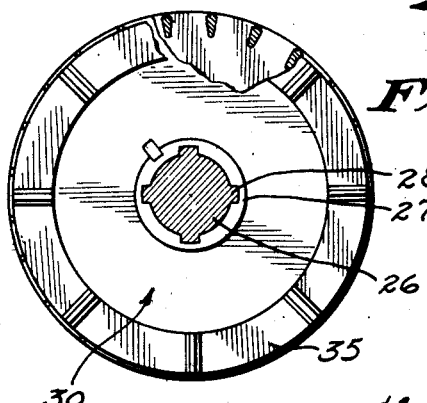
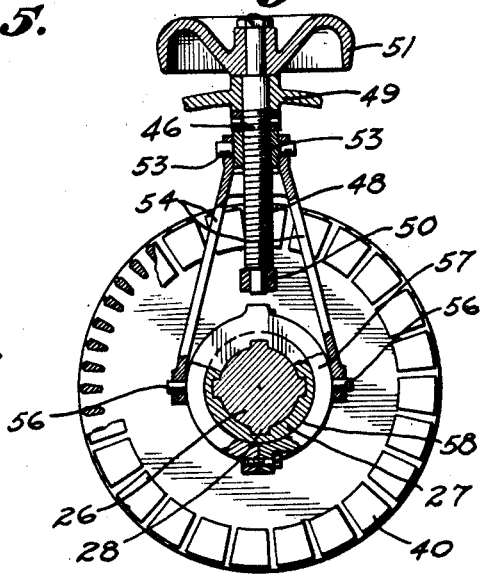
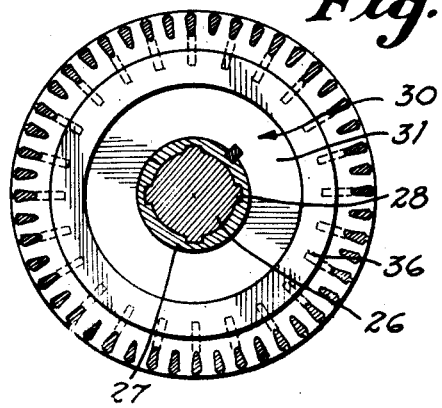
INVENTOR:
CARL E. JOHNSON,
BY
Ford W. Harris
ATTORNEY.

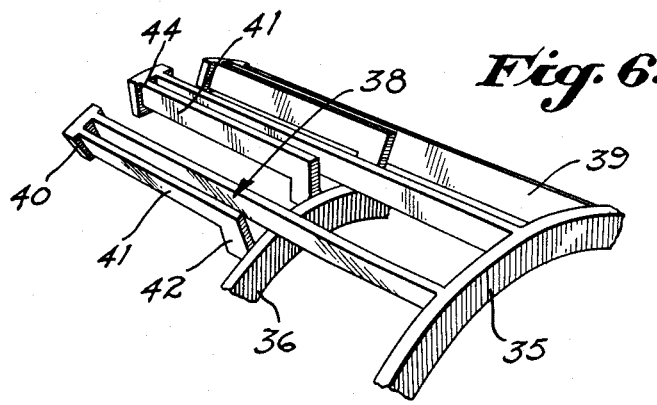
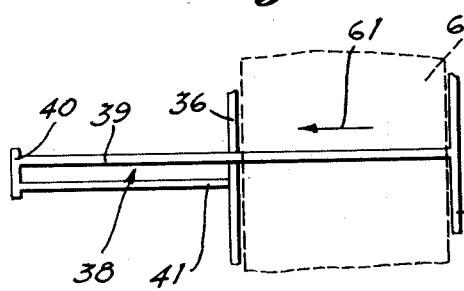
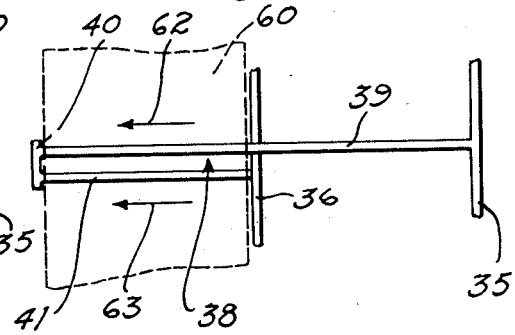
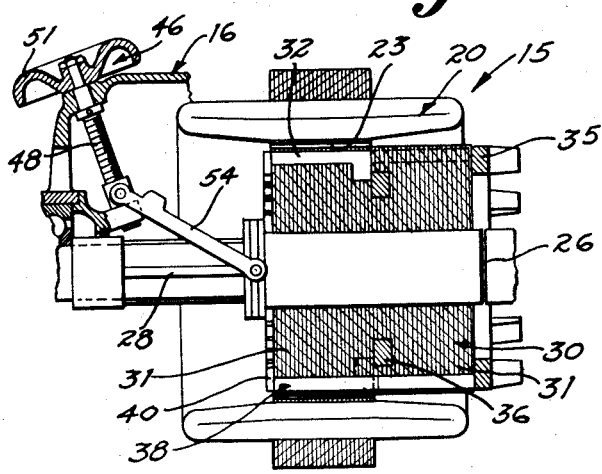

Aug. 12, 1930.  C. E. JOHNSON  1,772,719
VARIABLE SPEED SQUIRREL CAGE MOTOR
Filed Sept. 30, 1926   3 Sheets-Sheet 3
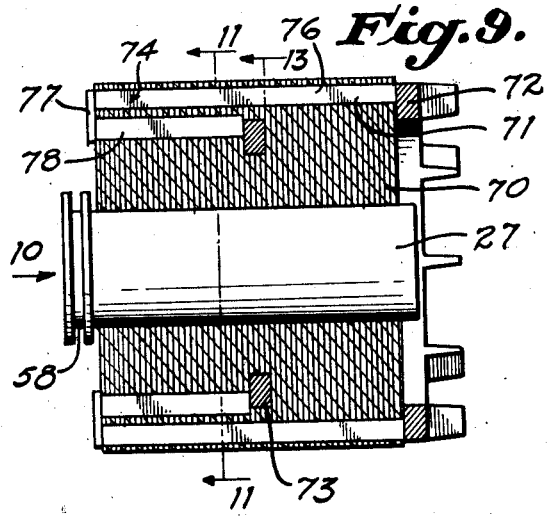
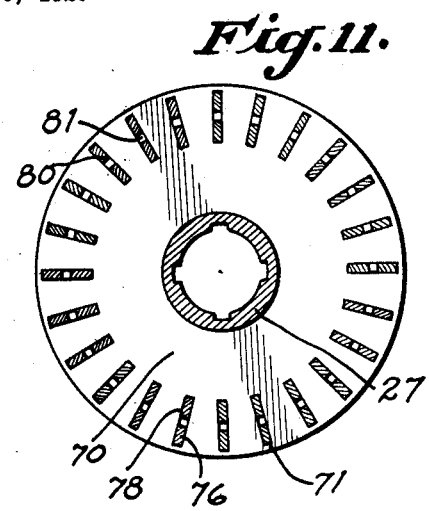
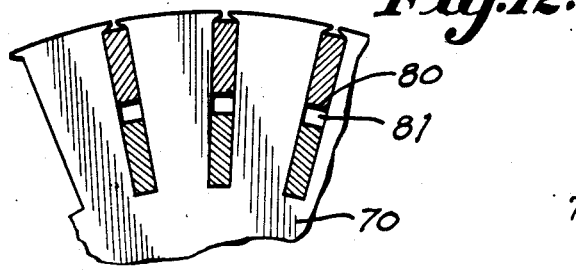
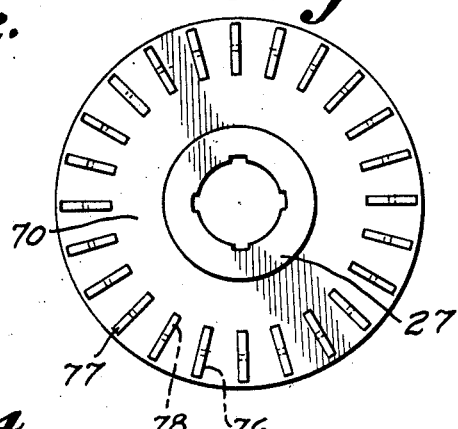
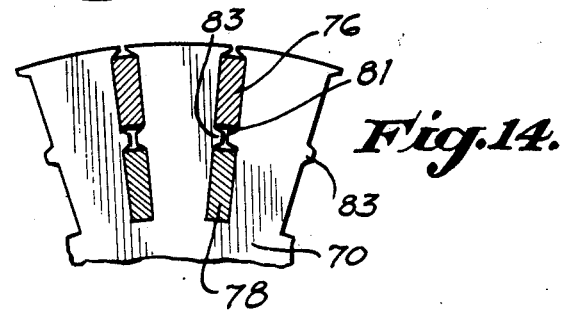
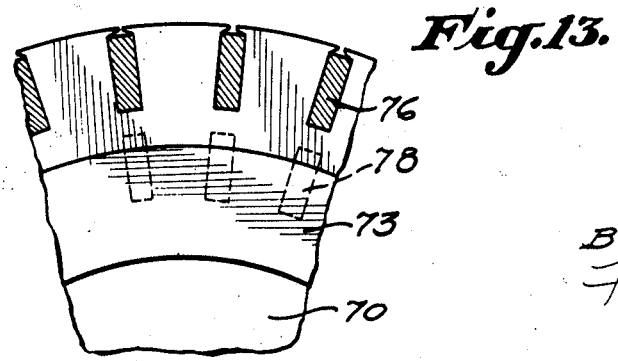
INVENTOR:
CARL E. JOHNSON.,
BY
Ford H. Harris
ATTORNEY.

Patented Aug. 12, 1930

1,772,719

UNITED STATES PATENT OFFICE

CARL E. JOHNSON, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA

VARIABLE-SPEED SQUIRREL-CAGE MOTOR

Application filed September 30, 1926. Serial No. 138,652.

This invention relates to electric motors and relates particularly to electric induction motors.

At the present time there is a large demand in the various industries for a variable speed alternating current motor. Most of the requirements for a motor of this character have been supplied by the common form of wound rotor slip-ring induction motor. Such a motor is reduced from synchronous speed to any desirable speed by the insertion of resistance into the rotor circuit, which serves to reduce the speed of the motor by increasing the voltage across the slip-rings. The principal disadvantage of the wound rotor slip-ring motor are: first, that they are much higher in first cost; second, that they require expensive resistance controlling devices for inserting resistance into the rotor circuit; and third, that considerable additional wiring is required.

It is an object of this invention to provide a variable speed induction motor. The motor of my invention is not expensive to produce and does not require resistance controlling devices or additional wiring. The speed thereof is varied by changing the axial position of the rotor within the stator of the motor.

Other objects and advantages of the invention will be made evident hereinafter.

Referring to the drawings in which I show different forms of my invention,

Fig. 1 is a cross section through a motor showing the first form of my invention.

Fig. 2 is a fragmentary section similar to Fig. 1, this view showing the rotor in a different axial position.

Fig. 3 is a section taken as indicated by the line 3—3 of Fig. 1.

Fig. 4 is a section of the rotor taken as indicated by the line 4—4 of Fig. 1.

Fig. 5 is a view of the rotor partially sectioned, this view being taken on the line 5—5 of Fig. 1.

Fig. 6 is a perspective view showing the design of the rotor winding of this invention.

Figs. 7 and 8 are diagrams illustrating the principle of operation of the invention.

Fig. 9 is a section taken through a second form of rotor of the invention.

Fig. 10 is an end view of the rotor shown in Fig. 9, this view being taken as indicated by the arrow 10 of Fig. 9.

Fig. 11 is a section taken on the line 11—11 of Fig. 9.

Fig. 12 is an enlarged fragmentary section of the rotor shown in Fig. 9 and being taken substantially on the same line as Fig. 11.

Fig. 13 is an enlarged fragmentary section taken on the line 13—13 of Fig. 9.

Fig. 14 is an enlarged fragmentary section similar to Fig. 12, but showing the construction of a third form of rotor of the invention.

Referring to Figs. 1 to 8 inclusive, the first form of my invention is embodied in a motor 15 shown in Fig. 1. The motor 15 consists of a frame 16 having a base 17, which frame 16 supports a stator 19. The stator 19 consists of a primary magnetic body 20 composed of laminations of high magnetic permeability, and primary windings 21 carried by the primary magnetic body 20. The primary magnetic body 20 has an opening 23 formed therethrough. The primary windings 21 according to standard practice are adapted to be supplied with a polyphase current which causes the stator to set up a rotating field.

Bearings 25 are carried at opposite ends of the frame 16, these bearings 25 rotatably supporting a rotor shaft 26. Slidably disposed on the rotor shaft 26 is a rotor sleeve 27, this rotor sleeve 27 being splined to the shaft 26 by means of splines 28. The splines 28 permit the rotor sleeve 27 to be moved axially along the shaft 26 but prevent a rotation of the rotor sleeve thereon.

Carried by the rotor sleeve 27 is a rotor 30 which extends through the opening 23 of the stator 19 and which is about twice as ling as the stator. The rotor 30 consists of a secondary magentic body 31 which is rigidly secured on the rotor sleeve 27 and which is composed of laminations of high magnetic permeability. The rotor 30 has a secondary winding 32 which is carried by the secondary magnetic body 31. The secondary winding 32 is shown in the drawings in the form of a squirrel-cage similar to those employed in the standard induction motors. The secondary winding 32 has an outer end ring 35, which is situated at the right end of the secondary magnetic body 31, and an inner end ring 36, which is situated between the ends of the secondary magnetic body 31, being shown in the drawings as situated in a substantially central position. The inner end ring 36 is shown as being smaller in diameter than the outer end ring 35. Connecting the outer and inner end rings 35 and 36 together are conductor bars 38, which extend axially through the secondary magnetic body 31. The conductor bars 38 consist of transverse portions 39 which extend entirely through the secondary magnetic body 31, as shown clearly in Figs. 1, 2 and 6. At the left-hand end of the secondary magnetic body 31 are blocks 40 to which the transverse portions 39 connect. Connected to the blocks 40 are counter-portions 41 which extend inwardly to the center of the secondary magnetic body 31 directly adjacent to the transverse portions 39. The inner ends of the counter-portions 41 are provided with offset portions 42 which connect to the inner end ring 36. Therefore, it will be seen that the secondary winding of the rotor 32 consists of outer and inner end rings 35 and 36 and conductor bars 38 which connect them together, each of the conductor bars 38 consisting of a transverse portion 39, a block 40 and a counter-portion 41, the transverse portion 39 and the counter-portion 41 extending parallel to each other and parallel to the axis of the rotor.

The blocks 40 are provided to supply shoulders 44 so that the laminations of the secondary magnetic body 31 may be clamped together between the blocks 40 and the outer end ring 35. It will be evident from the drawings that the inner end ring 36 is made of smaller diameter than the outer end ring 35 so that the transverse portions 39 of the conductor bars 38 may pass to the outside thereof.

The rotor 30 may be moved from the position shown in Fig. 1 into the position shown in Fig. 2 by shifting mechanism generally indicated by the numeral 46. The shifting mechanism consists of a screw 48 which is rotatably supported in bearings 49 and 50 and which has an exterior handle 51. Threadedly carried on the screw 48 between the bearings 49 and 50 is a nut 52 from which trunnions 53 extend. The trunnions 53 engage the upper ends of arms 54 of a yoke. The lower ends of the arms 54 are pivoted on trunnions 56 which extend from a shift-ring 57 carried in an annular groove 58 formed at the left end of the rotor sleeve 27. By rotating the handle 51 the screw 48 may be rotated and the nut 52 may be moved from the position shown in Figs. 1 and 3 into the position shown in Fig. 2. The nut will therefore shift the rotor sleeve 27 and the rotor 30 from the positions shown in Fig. 1 into the position shown in Fig. 2 by means of the yoke.

The operation of my invention may be clearly understood from the diagrams in Figs. 7 and 8. Fig. 7 represents the rotor in the position shown in Fig. 1 which may be termed a "maximum voltage" position, and Fig. 8 represents the position of the rotor as shown in Fig. 2 which may be termed a "minimum voltage" position. Dotted lines 60 in Figs. 7 and 8 represent the primary magnetic body 20 of the stator. Considering the rotor 30 in maximum voltage position shown in Figs. 1 and 7, when polyphase current is supplied to the stator 19 a rotating field is established. This rotating field acts upon the right ends of the transverse portions of the conductor bars extending inside the primary magnetic body 20, establishing electromotive force which causes a current to flow therein in a direction indicated by the arrow 61 of Fig. 7. When the rotor is in the position shown in Figs. 1 and 7 a maximum electromotive force or voltage is set up and therefore a substantially synchronous speed of the rotor will be had.

In order to reduce the speed of the rotor it is necessary, as in the case of the ordinary wound rotor slip-ring motor, to increase the voltage of the rotor winding. In my invention I accomplish this by changing the axial position of the rotor 30. When the rotor is in "minimum voltage" position as shown in Figs. 2 and 8, the right ends of the transverse portions 39 are moved to the right side of the stator 19 and the left ends thereof and the counter-portions 41 are moved into position within the stator. The rotating field set up by the stator acts upon the portion of the secondary winding situated in this revolving field and produces an electromotive force. The electromotive force established in the left end of the transverse portion 39 tends to produce a current in a direction indicated by the arrow 62 thereof, and the electromotive force established in the counter-portion 41 tends to cause a current to flow therein in a direction indicated by the arrow 63 of Fig. 8. It will be seen then that the electromotive force tending to cause the current to flow in the counter-portion 41 is directly opposed to the electromotive force tending to cause a current to flow in the left end of the transverse portion 39. Therefore, it may be said that a counter electromotive force is established in the counter-portions 41 of each of the windings 38. Theoretically, since the length of the counter-portion 41 is equal to the length of that part of the transverse portion 39 in the revolving field, the counter electromotive force is equal to the direct electromotive force and therefore there will be no flow of current.

In the drawings the rotor is shown in two extreme positions. In Figs. 1 and 7 the rotor is shown in the position in which a maximum voltage or electromotive force will be established, and the rotor is shown in Figs. 2 and 8 in a position in which a minimum or no electromotive force will be established. From this it will be very apparent that by setting the rotor 30 in any position between maximum and minimum voltage positions that a voltage which will provide the desired speed of the rotor of the motor may be had.

In Figs. 9 to 13 inclusive I show a second form of rotor of my invention. This rotor consists of a secondary magnetic body 70 which carries a secondary winding 71. The secondary winding consists of an outer end ring 72 and an inner end ring 73, the outer end ring 72 being situated at the right end of the secondary magnetic body 70 and the inner end ring 73 being situated between the ends of the secondary magnetic body 70. The inner end ring 73 is of smaller diameter than the outer end ring 72. The end rings 72 and 73 are connected together by conductor bars 74. The conductor bars 74 each consist of a transverse portion 76 which connects to the outer end ring 72 and extends axially through the secondary magnetic body and connects to a block 77 situated at the left end of the secondary magnetic body 70. Each conductor bar 74 also has a counter-portion 78. In this form of the invention the counter-portion 78, instead of extending to the side of the left end of the transevrse portion, is extended inside the left end of the transverse portion 76. The outer end of each counter-portion 78 connects to one of the blocks 77, by means of which it is electrically connected to the adjacent transverse portion 76, and the inner end of each counter-portion 78 is connected to the inner end ring 73. In this form of the invention the punchings from which the secondary magnetic body is formed are provided with slots 80 in which both the left ends of the transverse portions 71 and the counter-portions 78 are situated. There is a short distance provided between the left ends of the transverse portions 76 and the counter-portions 78, and in this form of my invention the slots 80 provide air gaps 81 in this space between the two portions of each conductor bar of the secondary winding.

In some cases it may be advisable to provide the punchings with projections 83, as shown in Fig. 14, which is a fragmentary view illustrating a third form of the invention, these projections 83 partially filling the air gap 81 formed between the portions 76 and 78 of the conductor bars of the winding. This will reduce the reluctance of the magnetic path since it reduces the air gap 81 and will increase the reactance of the secondary winding which might be desirable for certain classes of service or characteristics.

From the foregoing description it will be seen that the motor of my invention provides a variable speed motor which does not require the use of resistance control devices for governing the voltage of the secondary winding such as is necessary in the common form of wound rotor slip-ring motor. The motor of my invention may be used wherever a variable speed motor is desirable. One particular use of my invention would be for driving turbine irrigation pumps. It is common practice at present to employ a constant speed squirrel-cage motor and there is therefore considerable difficulty in compromising the volume head and performance with the constant speed motor. In order to vary the output of the pump it is necessary to turn down the runners, change the stages or change the design of the runners, there being other complications involved. With the motor of my invention the output of the pump may be quickly adjusted to that desired by merely changing the speed of the motor.

I claim as my invention:

1. An induction motor comprising: a stator adapted to establish a rotating primary magnetic field; a rotor extending through said stator, said rotor having a secondary winding in which an electromotive force is induced, said secondary winding having a counter-portion in which an electromotive force counter to that produced in the rest of the secondary winding may be developed; and means for changing the axial position of said rotor in said stator so that said counter-portion may be moved into or out of said stator.

2. An induction motor comprising: a stator adapted to establish a rotating primary magnetic field; a rotor extending through said stator, said rotor comprising a secondary magnetic body, an outer end ring situated at one end of said secondary magnetic body, an inner end ring situated between the ends of said secondary magnetic body, and conductor bars connecting said outer and inner end rings together, said conductor bars extending from said outer end ring entirely through said secondary magnetic body and then to said inner end ring; and means for changing the axial position of said rotor in said stator.

3. An induction motor comprising: a stator adapted to establish a rotating primary magnetic field; a rotor extending through said stator, said rotor comprising a secondary magnetic body, an outer end ring situated at one end of said secondary magnetic body, an inner end ring situated between the ends of said secondary magnetic body, and conductor bars connecting said outer and inner end rings together, said conductor bars extending from said outer end ring entirely through said secondary magnetic body and then to said inner end ring, said rotor being longer than said stator; and means for changing the axial position of said rotor in said stator.

4. An induction motor comprising: a stator adapted to establish a rotating primary magnetic field; a rotor extending through said stator and axially movable relative thereto, said rotor including a magnetic core, windings embedded in said core, portions of said windings toward one end of said rotor being disposed so that an electromotive force is induced in said portions running counter to the electromotive force induced in the rest of said windings when said end of said rotor is disposed within said stator; and means for varying the axial position of said rotor relative to said stator.

5. A motor as recited in claim 4 in which the rotor core is magnetically unitary.

6. An induction motor comprising: a stator adapted to establish a rotating primary magnetic field; a rotor extending through said stator, said rotor comprising a secondary magnetic body; an outer end ring situated at one end of said secondary magnetic body; an inner end ring situated between the ends of said secondary magnetic body; and conductor bars in said secondary magnetic body, each of said conductor bars comprising a transverse portion extending through said secondary magnetic body and being connected at one end to said outer end ring, a block at the other end, and a counter-portion extending through said secondary body and terminating at said inner end ring.

7. A combination as defined in claim 6 in which said secondary magnetic body is laminated, the laminations being clamped between said outer end ring and said blocks of said conductor bars.

8. A rotor comprising: a magnetic body; a pair of end rings; and a plurality of conductor bars in said magnetic body, each of said bars having transverse and counter-portions which are parallel and of different lengths, said portions being connected together at one end independent of other conductor bars, and being respectively connected at their other ends to said end rings.

9. An induction motor comprising: means for establishing an electric field; a rotor in the influence of said field; a pair of end rings on said rotor; U-shaped conductor bars having legs of unequal length the ends of which are connected to said end rings; and means for changing the relative axial positions of said field and said rotor.

10. An induction motor comprising: a stator adapted to set up a magnetic field of a given length; a rotor mounted to rotate in said stator and being of substantially greater length than the length of said field whereby but a portion of the rotor is exposed to the flux of said field at a given time; a winding on said rotor comprising conductors extending longitudinally thereof and electrically connected together, there being more of said conductors in a primary portion of said rotor than in a secondary portion thereof; and means for relatively moving said rotor and said stator to vary the relative amounts of said primary and secondary portions exposed to said flux.

In testimony whereof, I have hereunto set my hand at Los Angeles, California, this 22 day of Sept., 1926.

CARL E. JOHNSON.